Oct. 31, 1950  F. W. FAUCETT  2,528,352
PLOW ATTACHMENT FOR TRACTORS
Filed Feb. 3, 1949
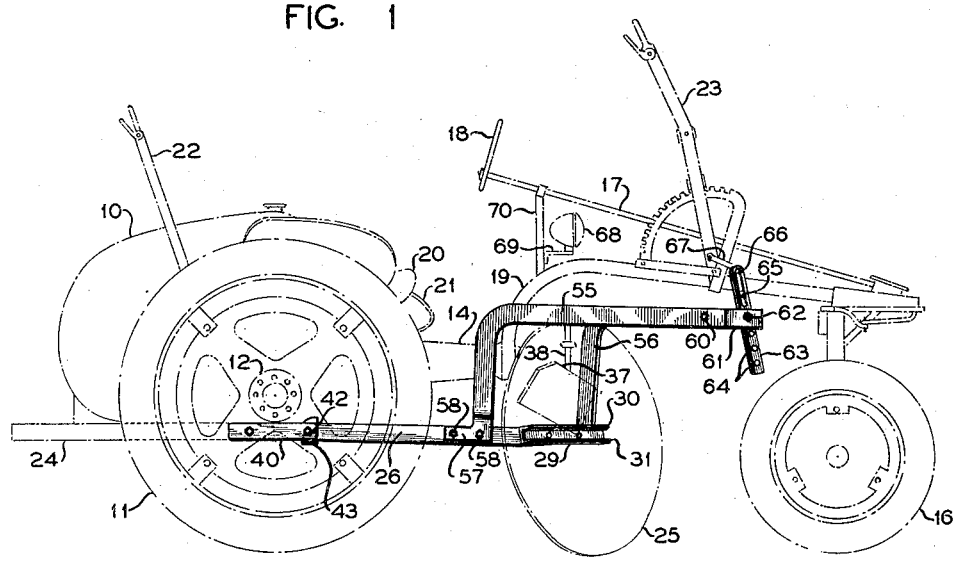
*INVENTOR.*
F. W. FAUCETT
BY
A. Yates Dowell
ATTORNEY Patented Oct. 31, 1950

2,528,352

UNITED STATES PATENT OFFICE 2,528,352

PLOW ATTACHMENT FOR TRACTORS

Floyd W. Faucett, Brent, Ala.

Application February 3, 1949, Serial No. 74,449

4 Claims. (Cl. 97—47)

This invention relates to implements employed in the treatment of the soil ordinarily referred to as agricultural implements. More particularly the invention relates to motorized farm tools specifically a tractor plow and the method of supporting the same in order to derive maximum advantages from the use of the same.

Agricultural implements have been mounted in various ways on motorized and non-motorized vehicles, but they have been subject to criticism for one reason or another, such as difficulty of applying and removing, their cost, unsatisfactory results from their use, and for other reasons.

An object of the invention is to provide simple and inexpensive mechanism for supporting a plow from a relatively small tractor in a manner such that the plow is pushed instead of towed and the height of which can be varied as desired.

A further object of the invention is to provide a mounting frame for a front mounted disk plow which can be easily manufactured, which is of few parts, and which can be readily attached to a conventional tractor structure.

Briefly stated, the invention comprises a plow attachment including a reinforced frame capable of being easily attached to a tractor in a manner to support a disk plow ahead of the engine so that in operation it may be pushed and with mechanism for positioning the same at the proper level.

Further objects and advantages of the invention will be apparent from the following specification taken in conjunction with the accompanying drawings, wherein:

Fig. 1 is a side elevation illustrating application of the invention to a tractor of conventional construction;

Fig. 2, a perspective of the reinforced frame employed for mounting the plow on the tractor; and Fig. 3, a vertical section taken through the disk plow and the connecting means therefor.

With continued reference to the drawings, a relatively small tractor 10 of conventional construction has driving wheels 11 mounted on an axle housing 12 extending into a transmission housing 13 with a forwardly projecting power take-off housing 14, there being a fly-wheel housing 15 located rearwardly of the transmission housing 13.

The tractor is provided with a pair of front wheels 16 adapted to be steered through a steering column 17 by means of a steering wheel 18. The front end of the power take-off 14 is cradled in a yoke 19, the front end of which is supported by the wheels 16.

The tractor is provided with a conventional seat 20 supported on a spring 21 so that the operator of the tractor is conveniently located for operation of the steering wheel, as well as the lever 22 for cultivating equipment attached to the tractor behind the same.

The seat 20 is in such a location that an operator seated thereon can manipulate a lever 23 for raising and lowering cultivating attachments that are customarily pushed before the tractor.

The tractor also includes a conventional U-shaped frame having arms 24 which terminate in the vicinity of the axle housing 12.

In order to support a disk-type plow 25, a suitable frame is provided which consists of right and left side bars 26 and 27, the left side bar 27 having an angular extension 28 and such side bars being connected by a relatively wide channel member 29 which can be welded or otherwise secured to the bars 26 and 28. The front surface of the channel member 29 is disposed at a slight angle so that its lower edge is slightly in advance of its upper edge. This channel member has forwardly projecting flanges 30 and 31 between which are adapted to be mounted the upper and lower flanges 32 and 33 of a U-shaped member 34, such member being held in position by means of bolts 36, and another bolt 35 serving to fasten the disk plow 25 in place on the member 34.

A scraper 37 is mounted over the face of the disk plow 25 and is attached to an arm 38 secured on the rear of the member 29 by means of a bolt or other fastening element.

The rear ends of the right and left side bars 26 and 27 are connected by means of links 40 and 41 to the front ends of the arms 24 of the frame, such links being secured in position by means of bolts 42.

Between the rear ends of the side bars 26 and 27 is mounted a U-shaped cross member 43 having its extremities forming upturned arms 44 and 45, fastened to the bars 26 and 40 on one side of the frame and to the bars 27 and 41 on the opposite side of the frame by means of the bolts 42 which also serve as pivots for the arms 26 and 27.

The transverse bar 43 is provided with slots 46 and 47 for the reception of bolts 48 by means of which right angle brackets 49 and 50 are attached to the bar 43. The upper ends of these brackets are provided with openings 51 and 52 for the reception of machine screws threaded into the transmission housing 13.

In order to give the frame sufficient strength and rigidity to withstand the force between the plow 25 and the tractor, a reinforcing angle bar or brace 53 is provided while a reinforcing bar 54 joins forward portions of the bars 26 and 27. The bars 53 and 54 are in the angular relation as shown in Fig. 2 to accommodate the necessary stress to which the frame is subjected. The angle brace between the rear portions of the side bars has its end joining the left side bar in advance of its opposite end and the brace 54 which likewise joins the side bars has its end adjacent the right side bar located in advance of its other end.

The forward portion of the frame is capable of being swung about the pivots 42 so that the front end of the frame may be located at the desired height for the plow to cut the desired depth. In order to support the front end of the frame and plow carried thereby at the proper height, a pair of angle bars or beams 55 and 56 are employed. The rear extremity of the beam 55 is provided with a rearwardly extending horizontal portion 57 connected by bolts 58 to the side bar 26, the rear end of the bar or beam 56 being connected to the bar 28 in the same manner.

The front end of the bar 56 is provided with an angular portion 59 disposed in a plane parallel to that of the bar 55 and fastened to the latter by means of a bolt 60. The forward end of the bar 55 is provided with an angular extension 61 to which is held by means of a bolt 62 a connecting link 63 provided with openings 64 in which the bolt 62 may be disposed for adjusting the height of the plow 25. The upper end of the link is provided with a slot 65 for the reception of a pin 66 carried on the lower end of another link 67, the upper end of which is rigidly connected to the lever 23, the purpose of such connection being to permit the plow, including the adjusting link with the slot 65, to move upwardly until the lower portion of the slot is adjacent the pin 66.

If desired, a light 68 may be mounted by means of a bracket 69 upon a support 70 for the steering column 17.

It will be readily apparent from the foregoing that a frame is provided which may be readily and simply attached to or removed from a tractor by connecting two bolts on each side at the rear of the frame and by applying the pin 66 carried by the link 67 into the slot 65 of the link 63.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A unitary plow supporting frame adapted to be mounted between the front and rear wheels of a tractor comprising side bars for pivotal connection at their rear ends to the sides of the frame of the tractor and having a cross member connected to the rear ends of said side bars, brackets on said cross member, means for securing said brackets to the transmission housing of a conventional tractor, an angle brace disposed between the rear portions of said side bars and with its end joining the left side bar in advance of its end joining the right side bar, a second brace between said side bars and its end adjacent the right side bar in advance of its opposite end, the left side bar being shorter than the right side bar and having an angular portion extending forwardly of the right side bar, a transverse member joining such forward extension and the forward end of the right side bar and disposed at an angle to the right side bar with its end adjacent the right side bar rearwardly of its opposite end and with its lower portion disposed in advance of its upper portion, means for attaching a disk plow in front of the same and a scraper on the same with a scraping edge in proximity to the front of the disk plow for limiting the amount of earth adhering to the front of the plow, a pair of converging plow beams connected to said right side-bar and the extension to the left side bar and connected in a line substantially forming an extension of said right side bar, a connecting and adjusting link pivotally adjustably mounted at the forward end of said converging plow beams and having a slot in its upper end for the reception of a raising and lowering link but allowing the adjusting link to move upwardly on the connecting link to compensate for obstructions in the soil engaged by the plow.

2. A unitary plow supporting frame adapted to be mounted between the front and rear wheels of a tractor comprising side bars for pivotal connection at their rear ends to the sides of the frame of the tractor and having a cross member connected to the rear ends of said side bars, brackets on said cross member, means for securing said brackets to the transmission housing of a conventional tractor, an angle brace disposed between the rear portions of said side bars and with its end joining the left side bar in advance of its end joining the right side bar, a second brace between said side bars and its end adjacent the right side bar in advance of its opposite end, the left side bar being shorter than the right side bar and having an angular portion extending forwardly of the right side bar, a transverse member joining such forward extension and the forward end of the right side bar and disposed at an angle to the right side bar with its end adjacent the right side bar rearwardly of its opposite end and with its lower portion disposed in advance of its upper portion, means for attaching a disk plow in front of the same, a connecting and adjusting link pivotally and adjustably attached to the forward end of said frame and having a slot in its upper end for the reception of a raising and lowering link but allowing the adjusting link to move upwardly on the connecting link to compensate for obstructions in the soil engaged by the plow.

3. A unitary plow supporting frame adapted to be mounted between the front and rear wheels of a tractor comprising side bars for pivotal connection at their rear ends to the sides of the frame of the tractor and having a cross member connected to the rear ends of said side bars, brackets on said cross member, means for securing said brackets to the transmission housing of a conventional tractor, the left side bar being shorter than the right side bar and having an angular portion extending forwardly of the right side bar, a transverse member joining such forward extension and the forward end of the right side bar and disposed at an angle to the right side bar with its end adjacent the right side bar rearwardly of its opposite end and with its lower portion disposed in advance of its upper portion, means for attaching a disk plow in front of the same, a connecting and adjusting link pivotally and adjustably attached to the forward end of said frame and having a slot in its upper end for the reception of a raising and lowering link but allowing the adjusting link to move upwardly on the connecting link to compensate for obstructions in the soil engaged by the plow.

4. A unitary plow supporting frame adapted to be mounted between the front and rear wheels of a tractor comprising side bars for pivotal connection at their rear ends to the sides of the frame of the tractor and having a cross member connected to the rear ends of said side bars, one of said side bars being shorter than the other side bar, a transverse member joining said side bars and with its lower portion disposed in advance of its upper portion, means for attaching a disc plow to the forward side of said transverse member, a connecting and adjusting link pivotally and adjustably attached to the forward end of said frame and having a slot in its upper end for the reception of a raising and lowering link but allowing the adjusting link to move upwardly on the raising and lowering link to compensate for obstructions in the soil engaged by the plow.

FLOYD W. FAUCETT.

REFERENCES CITED

The following references are of record in the file of this patent:

UNITED STATES PATENTS

| Number | Name | Date |
| --- | --- | --- |
| 1,870,740 | Leiter | Aug. 9, 1932 |
| 1,894,516 | Karstedt | Jan. 17, 1933 |
| 2,050,424 | Davis | Aug. 11, 1936 |
| 2,164,543 | Peacock | July 4, 1939 |
| 2,177,871 | Denler | Oct. 31, 1939 |